United States Patent
Fukuda et al.

[11] Patent Number: 5,433,988
[45] Date of Patent: Jul. 18, 1995

[54] MULTI-LAYER REFLECTION MIRROR FOR SOFT X-RAY TO VACUUM ULTRAVIOLET RAY

[75] Inventors: Yasuaki Fukuda, Machida; Yutaka Watanabe, Atsugi; Shigetaro Ogura, Tama; Takashi Iizuka, Yokohama, all of Japan

[73] Assignee: Canon Kabushiki Kaisha, Tokyo, Japan

[21] Appl. No.: 323,592

[22] Filed: Oct. 17, 1994

Related U.S. Application Data

[60] Continuation of Ser. No. 86,367, Jul. 6, 1993, abandoned, which is a continuation of Ser. No. 844,285, Mar. 2, 1992, abandoned, which is a division of Ser. No. 602,922, Oct. 25, 1990, abandoned, which is a continuation of Ser. No. 246,012, Sep. 14, 1988, abandoned, which is a continuation of Ser. No. 102,498, Sep. 29, 1987, abandoned.

[30] Foreign Application Priority Data

| Oct. 1, 1986 | [JP] | Japan | 61-231246 |
| Oct. 1, 1986 | [JP] | Japan | 61-231247 |
| Dec. 25, 1986 | [JP] | Japan | 61-307757 |

[51] Int. Cl.⁶ ............................ G02B 5/28
[52] U.S. Cl. ............................ 428/141; 428/433; 428/446; 428/472; 428/698; 428/408; 428/704; 428/913; 359/359; 359/360; 359/361
[58] Field of Search ............ 428/141, 433, 446, 408, 428/472, 698, 704, 913; 359/359, 360, 361

[56] References Cited

U.S. PATENT DOCUMENTS

| 4,098,956 | 7/1978 | Blickensderfer et al. | 428/469 |
| 4,450,201 | 5/1984 | Brill et al. | 428/469 |
| 4,461,532 | 7/1984 | Sato et al. | 359/359 |
| 4,599,281 | 7/1986 | Schintlmeister et al. | 428/698 |
| 4,619,865 | 10/1986 | Keem et al. | 428/698 |
| 4,693,933 | 9/1987 | Keem et al. | 428/704 |
| 4,727,000 | 2/1988 | Ovshinsky et al. | 428/635 |
| 4,770,479 | 9/1988 | Tustison | 428/472 |
| 4,772,080 | 9/1988 | Tustison et al. | 428/702 |
| 4,785,470 | 11/1988 | Wood et al. | 428/704 |
| 4,835,062 | 5/1989 | Holleck | 428/472 |
| 4,844,989 | 7/1989 | Murduck et al. | 428/698 |
| 4,855,186 | 8/1989 | Grolig et al. | 428/216 |

OTHER PUBLICATIONS

Baumeister et al "Use of hafnium dioxide in multilayered dielectric reflectors for near uv" Appl. Opt. vol. 16, No. 2 Feb 77 pp. 439-444.

*Primary Examiner*—Archene Turner
*Attorney, Agent, or Firm*—Fitzpatrick, Cella, Harper & Scinto

[57] ABSTRACT

A multi-layer reflection mirror for soft X-ray to vacuum ultraviolet ray, comprises a substrate, a plurality of first layers, and a plurality of second layers formed on the substrate alternately with the first layers. The first layers primarily consists of at least one of single elements, such as ruthenium, or of a boride carbide, silicate, nitride oxide of a transition metal. The second layers primarily consists of at least one of compounds of carbon, silicon (e.g. carbide, nitride and oxide of silicon), boron (e.g. carbide, nitride and oxide of boron), beryllium (e.g. carbide, nitride and oxide of beryllium) and aluminum (e.g. carbide, nitride and oxide of aluminum).

11 Claims, 1 Drawing Sheet

MULTI-LAYER REFLECTION MIRROR FOR SOFT X-RAY TO VACUUM ULTRAVIOLET RAY

This application is a continuation of application Ser. No. 08/086,367 filed Jul. 6, 1993, now abandoned, which is a continuation of application Ser. No. 07/844,285 filed Mar. 2, 1992 now abandoned which is a division of 07/602,922 filed Oct. 25, 1990 now abandoned which is a continuation of application Ser. No. 07/246,012 filed Sep. 14, 1988, now abandoned, which is a continuation of application Ser. No. 07/102,498 filed Sep. 29, 1987, now abandoned.

BACKGROUND OF THE INVENTION

The present invention relates to a multilayer reflection mirror for soft X-ray to vacuum ultraviolet ray used for incidence of light having a wavelength of less than 200 nm which is called soft X-ray to vacuum ultraviolet ray, at an incident angle closely perpendicular to a mirror surface.

In the past, there has been no reflection mirror having a high (reflectivity) for a light having a shorter wavelength than an area called the vacuum ultraviolet which is directed perpendicularly or closely perpendicularly to the mirror plane, and a reflection factor has been less than 1% for the incident angle close to the perpendicular incident angle. In an oblique incident reflection mirror which has a relatively high reflection factor, it is necessary to adjust the incident angle between 1° and 2°-3° relative to the mirror plane. Because the light has to be directed to the plane with a very small angle, a very large size mirror is required even for a fine light beam and the use thereof is difficult, and limited freedom of design of the optical system, and the face that reflection mirror must be polished in order to have a high degree of planarity over a wide area makes the use thereof difficult.

As vacuum evaporation techniques have advanced recent years, a multi-layer reflection mirror having a number of super-thin films laminated have been manufactured, and the reflection mirror having a high reflection factor by the use of interference has been put into practice.

In the area of X-ray and vacuum ultraviolet ray, refractive indices of most materials are represented by complex refractive indices (n+ik, hereinafter called refractive indices) having imaginary number portions k representing absorption, and real number portions n being substantially equal to 1.0 ($n = 1 - \delta$, $\delta$, $\simeq 10^{-1} - 10^{-3}$). Accordingly, a Flesnel reflection factor at a boundary of vacuum and material thin film is very small, that is, in the order of 0.1% or less, The reflection factor does not exceed several % per boundary plane ever at a boundary of laminated thin films of heterogeneous materials. By alternately laminating heterogeneous materials to form a multi-layer laminated structure so that reflected lights from the respective layer boundaries enhance each other by interference a reflection factor of the entire multi-layer film is maximized and, a high reflection factor is thus attained. By selecting a combination of heterogeneous materials which results in a big difference between refractive indices of adjacent layers to attain a high reflection factor together with the multi-layer film structure, a reflection mirror which has a high reflection factor at an incident angle close to a normal incident angle is attained.

In known combinations of materials, a transition metal element having a high melting point is used as a material for a low refractive index layer, and a semiconductor element such as carbon or silicon is used as a material for a high refractive index layer. Typical examples are combinations of tungsten (W) and carbon (C) and combinations of molybdenum (Mo) and silicon (Si). (See S. V. Gaponor et al, Optics Comm. 38 (1981), 7; T. W. Barbee et al, App. Opt. 24 (1985), 883).

When a high intensity light such as a synchrotron track radiation light is applied to a reflection mirror having such a combination, the reflection mirror is locally heated and the multi-layer structure will be readily broken if the high refractive index layer has a low melting point (for example, Si).

In order to avoid the above problem, the low refractive index metal layer having a high melting point may be used, but a metal single body usually has a melting point of around 2500° C. (for example, Mo/Si) and a metal having a melting point of 3000° C. or higher (for example, W/C) does not attain a high reflection factor.

SUMMARY OF THE INVENTION

It is an object of the present invention to provide a reflection mirror which eliminates the above problems, retains a high reflection coefficient, has a high heat resistance and minimizes diffusion between layers.

DESCRIPTION OF THE PREFERRED EMBODIMENTS

Figure 1:
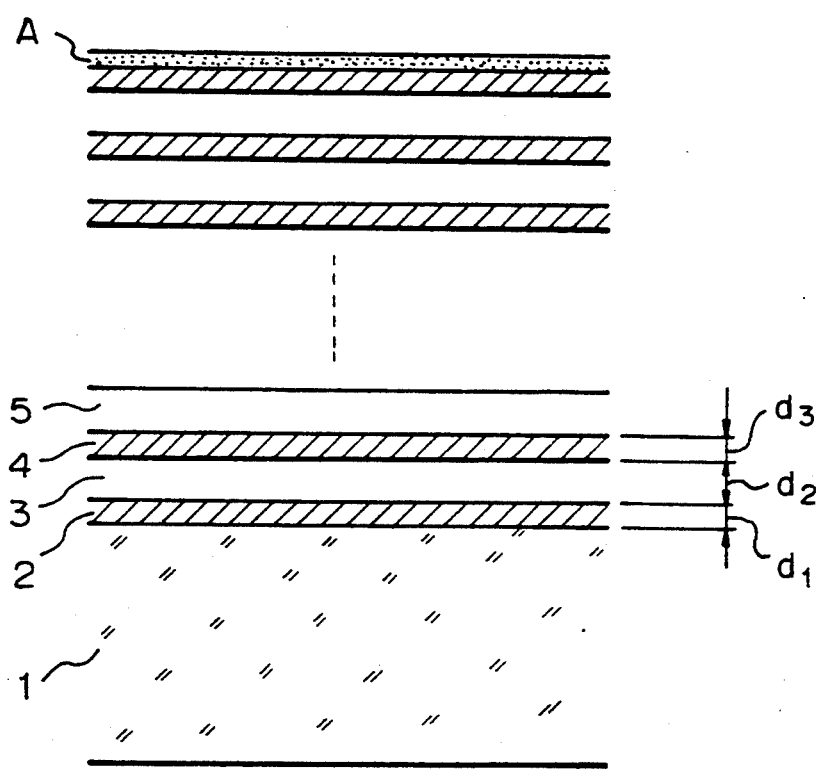
FIG. 1 shows a diagram of an embodiment of a multi-layer reflection mirror for soft X-ray to vacuum ultraviolet ray.

The above object of the present invention is achieved in the embodiments 1, 2 and 3 by the multilayer reflection mirror for soft X-ray to vacuum ultraviolet ray having a multi-layer thin film structure of alternate high refractive index layers and low refractive layers for soft X-ray to vacuum ultraviolet ray, wherein the low refractive index layer primarily consists of one or more single element of transition metals and the high refractive index layer primarily consists of one or more of carbide, nitride or oxide of silicon or boron.

FIG. 1 shows a diagram of one embodiment of the multi-layer reflection mirror for soft X-ray to vacuum ultraviolet ray of the present invention.

The multi-layer reflection mirror shown in FIG. 1 has a planar or curved substrate 1 polished sufficiently smoothly relative to a wavelength used (for example, surface roughness rms is 10 Å or less) on which first low refractive index layers 2, 4, 6, . . . and second high refractive index layers 3, 5, 7, . . . are alternately laminated.

The low refractive index layer of the embodiments 1, 2 and 3 primarily consists of one or more of single elements of transition metal.

The transition metal used in the present invention is an element having electron vacancies in 3d, 4d and 5d tracks such as scandium (Sc), titanium (Ti), vanadium (V), chromium (Cr), iron (Fe), nickel (Ni), cobalt (Co), zirconium (Zr), niobium (Nb), molybdenum (Mo), technetium (Tc), ruthenium (Ru), rhodium (Rh), hafnium (Hf), tantalum (Ta), tungsten (W), rhenium (Re), osmium (Os), iridium (Ir), platinum (Pt), or copper (Cu), palladium (Pd), silver (Ag) or gold (Au) having 3d, 4d and 5d tracks filled with electrons.

The high refractive index layer in the embodiments 1, 2 and 3 primarily consists of one or more of carbide, nitride or oxide of silicon, boron, berylium or aluminum. Specifically, the carbide is silicon carbide (SIC) or boron carbide ($B_4C$), the nitride is silicon nitride ($Si_3N_4$) or boron nitride (BN), and the oxide is silicon monoxide (SiO) or silicon dioxide ($SiO_2$). One of those compounds or a mixture of two or more of them constitutes the high refractive index layer.

Film thicknesses $d_1, d_2, \ldots$ of the respective layers are larger than $\frac{1}{4}$ of the wavelength used and alternate layers are of the same material. The film thickness is determined by having to balance satisfying a condition in which all reflected lights from boundaries of the layers interfere to enhance each other as well as satisfying a condition in which reduction of a total reflection factor is smaller than reduction of a reflection factor due to an absorption loss by an absorber and a phase shift. For example, the film thicknesses of the same material layers may be equal for easiness of manufacture, or the film thickness may be adjusted for each layer to maximize the reflection factor.

The material of the laminated layer is preferably selected such that the refractive index of an outermost layer which faces air has a big difference from the refractive index of air in order to attain a high reflection factor. To this end, the low refractive index layer is preferably the outermost layer. It is also desirable that a difference between a refractive index of the substrate and a refractive index of the layer adjacent to the substrate is big.

The reflection mirror of the present invention includes a two-layer structure having one high refractive index layer and one low refractive index layer but ten or more layered structure is preferable because the greater the number of alternate layers is, the higher is the reflection index. However, since the absorption significantly increases if the number of layers is too large, up to 200-layer structure is preferable for ease of manufacture. A protective layer of a low absorption and stable material may be formed on the outermost layer.

In order to manufacture the multi-layer reflection mirror for soft X-ray to vacuum ultraviolet ray of the present invention, electron beam vapor deposition in ultra-high vacuum or sputtering method in vacuum having sufficiently low amount of residual oxygen where compound material is used may be effectively utilized. Alternatively, resistive heating vapor deposition, CVD, reactive sputtering or other thin film forming method may be used.

The multi-layer reflection mirror for soft X-ray to vacuum ultraviolet ray of the present invention is usually formed on a substrate of glass, molten quartz, silicon single crystal or silicon carbide having a surface thereof polished sufficiently smoothly relative to the wavelength used.

The embodiments 1, 2 and 3 will be explained in further detail.

Embodiment 1

On a silicon carbide (SIC) substrate 1 optically polished to have a surface precision of $\lambda/20$ ($\lambda=6328$ Å) and surface roughness of 10 Å (rms), ruthenium (Ru) low refractive index layers 2, 4, ... each having a thickness of 34.3 Å and silicon dioxide ($SiO_2$) high refractive index layers 3, 5, ... each having a thickness of 31.0 Å were laminated to form a 41-layer structure (Ru: 21 layers, $SiO_2$: 20 layers). The outermost layer of the lamination was ruthenium layer, and a carbon (C) protective film 10 having a thickness of 5 Å was formed thereon to complete the multi-layer reflection mirror for soft X-ray to vacuum ultraviolet ray.

Both the ruthenium layers and the silicon dioxide layers were formed by the electron beam vapor deposition in a ultra-high vacuum (below $1 \times 10^{-7}$ Pa). The vapor deposition rate was 0.2 Å/s for both materials. The protective layer was formed by the electron beam vapor deposition.

When a light having a wavelength of 124.0 Å was directed normally to the multi-layer reflection mirror for soft X-ray to vacuum ultraviolet ray, a reflection factor of 54.7% was attained. A similar multi-layer reflection mirror for soft X-ray to vacuum ultraviolet ray having 41 laminated layers with the thickness of ruthenium layer being 36.8 Å, the thickness of silicon dioxide layer being 33.2 Å and the thickness of carbon protective layer being 5 Å was formed. When a light was directed thereto at an incident angle of 20 degrees with respect to a normal line, a reflection factor of 56.4% was attained.

Embodiment 2

On a polished silicon substrate, tantalum (Ta) low refractive index layers 2, 4, ... each having a thickness of 19.9 Å and boron carbide ($B_4C$) high refractive index layers 3, 5, ... each having a thickness of 44.1 Å were laminated to form a 101-layer structure (Ta: 51 layers, $B_4C$: 50 layers). The outermost layer of the lamination was the tantalum layer, and a carbon protective layer 10 having a thickness of 10 Å was formed thereon to complete the multi-layer reflection mirror for soft X-ray to vacuum ultraviolet ray.

Both the low refractive index layers and the high refractive index layers were formed by the electron beam vapor deposition in a ultra-high vacuum (below $1 \times 10^{-7}$ Pa). The vapor deposition rate was 0.2 Å/s for both materials.

When a light having a wavelength of 124.0 Å was directed normally to the multi-layer reflection mirror for soft X-ray to vacuum ultraviolet ray, a reflection factor of 12.7% was attained.

A similar multi-layer reflection mirror having a 101-layer structure with the thickness of the low refractive index layer being 21.0 Å and the thickness of the high refractive index layer being 47.7 Å was formed. When a light having a wavelength of 124.0 Å was directed thereto at an incident angle of 20° with respect to a normal line, a reflection factor of 12.9% was attained.

Embodiment 3

On a polished molten (fused) quartz substrate, hafnium (Hf) low refractive index layers 2, 4, ... each having a thickness of 25.5 Å and silicon nitride ($Si_3N_4$) high refractive index layers 3, 5, ... each having a thickness of 36.8 Å were laminated to form a 41-layer structure (Hf: 21 layers, $Si_3N_4$:20 layers). The outermost layer of the lamination was the hafnium low refractive index layer, and a carbon protective film 10 having a thickness of 10 Å was formed thereon to complete the multi-layer reflection mirror for soft X-ray to vacuum ultraviolet ray of the present invention.

Both the high refractive index layers and the low refractive index layers were formed by the electron beam vapor deposition in the ultrahigh vacuum (below $1 \times 10^{-7}$ Pa). The vapor deposition rate was 0.2 Å/s for both materials.

When a light having a wavelength of 124.0 Å was directed normally to the multi-layer reflection mirror for soft X-ray to vacuum ultraviolet-ray, a reflection factor of 13.7% was attained.

A multi-layer reflection mirror having a 41-layer structure with the thickness of the low refractive index layer being 26.6 Å and the thickness of the high refractive index layer being 39.7 Å was formed. When a light having a wavelength of 124.0 Å was directed thereto at an incident angle of 20° with respect to the normal line, a reflection factor of 14.6% was attained.

The above object of the present invention is achieved in embodiments 4, 5 and 6 by the multi-layer reflection mirror for soft X-ray to vacuum ultraviolet ray having a multi-layer thin film structure of alternate high refractive index layers and low refractive index layers for soft X-ray to vacuum ultraviolet ray, wherein the low refractive index layer primarily consists of one or more of boride, carbide or silicate of transition metal and the high refractive index layer primarily consists of one or more of single elements of carbon, silicon, boron or beryllium or compounds thereof.

In those embodiments, the low refractive index layer primarily consists of one or more of boride, carbide, silicide, nitride or oxide of a transition metal.

In those embodiments, the compounds of the transition metal include boride such as tantalum boronide, hafnium boride, tungsten boride or niobium boride; carbide such as tantalum carbide, hafnium carbide, tungsten carbide or niobium carbide; silicide such as tantalum silicide, tungsten silicide or palladium silicide; nitride such as tantalum nitride, hafnium nitride, tungsten nitride or niobium nitride; and oxide such as tantalum oxynitride.

In those embodiments, the low refractive index layer may consist of one of-carbide, nitride or boride of the transition metal or two or more materials such as tantalum nitride (TAN) and niobium nitride (NbN) of any proportion.

The high refractive index layer primarily consists of one or more of single elements of carbon, silicon, boron or beryllium or compounds thereof such as silicon carbide and boron carbide.

The embodiments 4, 5 and 6 will be explained below in further detail.

Embodiment 4

On a silicon single crystal substrate 1 optically polished to have a surface precision of $\lambda/20$ ($\lambda=6328$ Å) and a surface roughness of 10 Å (rms), hafnium boride (HfB$_2$) low refractive index layers 2, 4, ... each having a thickness of 22.4 Å and beryllium (Be) high refractive index layers 3, 5, ... each having a thickness of 33.5 Å were laminated to form a 41-layer structure (21 HfB$_2$ layers and 20 Be layers). The outermost layer of the lamination was the hafnium boride layer, and a carbon (C) protective layer 10 having a thickness of 10 Å was formed thereon to complete the multi-layer reflection mirror for soft X-ray to vacuum ultraviolet ray of the present invention.

Since hafnium boride has a high melting point, 3250° C. the film thereof was formed by the electron beam vapor deposition in the ultra-high vacuum (below $1 \times 10^{-7}$ Pa). Since beryllium (Be) has a relatively low melting point ($-1300°$ C.), the film thereof was vapor-deposited by the resistive heating method. The vapor deposition rate was 0.2 Å/s for both materials. The protective layer was formed by the electron beam method.

When a light having a wavelength of 112.7 Å was directed normally to the multi-layer reflection mirror for soft X-ray to vacuum ultraviolet ray, a reflection factor of 31.3% was attained. A similar multi-layer reflection mirror having a 41-layer structure was formed, with the hafnium boronide layer being 23.2 Å thick, the beryllium layer being 36.2 Å thick and the carbon protective layer being 10 Å thick. When the light was directed thereto at an incident angle of 20° with respect to a normal line, a reflection factor of 34.3% was attained.

Embodiment 5

On a polished silicon substrate similar to that of the embodiment 4, tantalum nitride (TAN) low refractive index layers 2, 4, ... each having a thickness of 20.0 Å and silicon (Si) high refractive index layers 3, 5, ... each having a thickness of 40.8 Å were laminated to form a 41-layer structure (21 TaN layers and 20 Si layers). The outermost layer of the lamination was the tantalum nitride, layer, and a carbon protective layer 10 having a thickness of 10 Å was formed thereon to complete the multi-layer reflection mirror for soft X-ray to vacuum ultraviolet ray of the present invention.

The high melting point tantalum nitride film was formed by the electron beam vapor deposition in the ultra-high vacuum (below $1 \times 10^{-7}$ Pa). The high refractive index silicon film was formed in a similar manner. The vapor deposition rate was 0.2 Å/s for both materials.

When a light having a wavelength of 124.0 Å was directed normally to the multi-layer reflection mirror for soft X-ray to vacuum ultraviolet ray, a reflection factor of 42.5% was attained.

A multi-layer reflection mirror having a 41-layer structure was formed, with the low refractive index layer being 20.5 Å thick and the high refractive index layer being 44.0 Å thick. When a light having a wavelength of 124.0 Å was directed thereto at an incident angle of 20° with respect to a normal line, a reflection factor of 44.7% was attained.

Embodiment 6

On a silicon substrate polished in the same manner as the embodiment 4, tungsten carbide (W$_2$C) low refractive index layers 2, 4, ... each having a thickness of 21.1 Å and silicon (Si) high refractive index layers 3, 5, ... each having a thickness of 39.8 Å were laminated to form a 41-layer structure (21 W$_2$C layers and 20 Si layers). The outermost layer of the lamination was the low refractive index tungsten carbide layer. A carbon protective layer 10 having a thickness of 10 Å was formed thereon to complete the multi-layer reflection mirror for soft X-ray to vacuum ultraviolet ray of the present invention.

The high melting point tungsten carbide film was formed by the electron beam vapor deposition in the ultra-high vacuum (below $1 \times 10^{-7}$ Pa). The high refractive index silicon film was formed in the same manner. The vapor deposition rate was 0.2 Å/s for both materials.

When a light having a wavelength of 124.0 Å was directed normally to the multi-layer reflection mirror for soft X-ray to vacuum ultraviolet ray, a reflection factor of 42.8% was attained.

A multi-layer reflection mirror having a 41-layer structure was formed, with the low refractive index layer being 21.7 Å thick and the high refractive index layer being 42.9 Å thick. When a light having a wavelength of 124.0 Å was directed thereto at an incident angle of 20° with respect to a normal line, a reflection factor of 45.1% was attained.

The above object of the present invention is achieved in embodiments 7 and 8 by the multi-layer reflection mirror for soft X-ray to vacuum ultraviolet ray having alternate layers of two different refractive indices, wherein the materials of the layers are made of high melting point compounds. In this method, the materials of the layers are stable for heat and also chemically stable. Accordingly, the peel-off of the layer or diffusion between layers during heating of the multi-layer structure is prevented.

In the embodiments 7 and 8, the materials of the layers are high melting point compounds so that the performance of the reflection mirror is maintained even if it is locally heated by a high intensity light such as synchrotron track radiation light. Such materials may be compounds having a melting point of 2000° C. or higher, such as aluminum nitride (AlN), beryllium nitride ($Be_3N_2$), titanium nitride (TIN), niobium nitride (NbN), vanadium nitride (VN), zirconium nitride (ZrN), boron nitride (BN), hafnium nitride (HfN), tantalum nitride (TAN, $Ta_2N$), aluminum boride ($AlB_{12}$), titanium boride. ($TiB_2$), vanadium boride ($V_3B_4$, VB), tungsten boride (WB), hafnium boride ($HfB_2$), zirconium boride ($ZrB_2$), boron carbide ($B_4C$), molybdenum carbide ($Mo_2C$), beryllium carbide ($Be_2C$), silicon carbide (SIC), vanadium carbide ($V_2C$), tungsten carbide (WC, $W_2C$), hafnium carbide (HfC), niobium carbide (NbC), tantalum carbide (TaC), titanium carbide (TIC), zirconium carbide (ZrC), aluminum oxide ($Al_2O_3$), beryllium oxide (BeO), chromium oxide ($Cr_2O_3$), hafnium oxide ($HFO_2$), titanium oxide ($Ti_2O_3$), cerium oxide ($CeO_2$) and zirconium oxide ($ZrO_2$).

The two materials are selected from the above materials and alternately laminated such that $\Delta n = |n_1 - n_2| \geq 10^{-3}$, where $\hat{n}_1 = n_1 + ik_1$ is a retractive index of the material of the first layer and $n_2 = n_2 + ik_2$ is a refractive index of the material of the second layer. If $\Delta n = |n_1 - n_2| < 10^{-3}$ the combination may be such that it satisfies $|k_1 - k_2| > \Delta n$. In this manner, a high reflection factor is attained.

In those embodiments, the reflection factor of the multi-layer reflection mirror for soft X-ray to vacuum ultraviolet ray depends on the difference between the refractive indices of the two alternate layers, absorption rates of the layers, the number of layers laminated and the wavelength of the irradiated light. The difference between the refractive indices of the two materials is preferably at least 0.01 when the number of layers is 100 pairs.

In order to give a difference between the refractive indices of the alternate layers, high refractive coefficient material and low refractive index material for a light in the range of X-ray to vacuum ultraviolet ray may be alternately laminated. The low refractive index and high melting point material may be boride, nitride, carbide or oxide of transition metal, and the high refractive index and high melting point material may be nitride, carbide or oxide of beryllium, aluminum, boron or silicon.

The embodiments 7 and 8 are explained below in further detail.

Example 7

On a silicon substrate 1 coated with silicon carbide (SIC) optically polished to have a surface precision of $\lambda/20$ ($\lambda = 6328$ Å) and a surface roughness of 7 Å(rms), hafnium nitride (HfN) low refractive index layers 2, 4, . . . each having a thickness of 23.0 Å and silicon carbide (SIC) high refractive index layers 3, 5, . . . each having a thickness of 38.8 Å were alternately laminated to form a 41-layer structure (21 HfN layers and 20 SiC layers). The outermost layer of the lamination was the hafnium nitride layer, and a carbon (C) protective layer A having a thickness of 10 Å was formed thereon. Both the hafnium nitride layers and the silicon carbide layers were deposited by the electron beam vapor deposition in the ultra-high vacuum ($<10^{-6}$ Pa). The vapor deposition rate was 0.2 Å/sec for both materials. The protective layer was formed by the electron beam method.

When a light having a wavelength of 124.0 Å was directed normally thereto, a reflection factor of 29.8% was attained.

Another multi-layer reflection mirror having the hafnium nitride layer thickness of 23.8 Å and the silicon carbide layer thickness of 41.9 Å was formed. When the light having a wavelength of 124.0 Å was directed thereto at an incident angle of 20°, a reflection index of 31.5% was attained.

Embodiment 7

On a silicon substrate coated with silicon carbide of 100μ thick polished in the-same manner as the embodiment 7, tantalum nitride (TAN) low refractive index layers 2, 4, . . . each having a thickness of 21.7 Å and silicon carbide (SIC) high refractive index layers 3, 5, . . . each having a thickness of 40.1 Å were alternately laminated to form a 41-layer structure (21 TaN layers and 20 SiC layers). The outermost layer of the lamination was the tantalum nitride having a large refractive index difference from vacuum, and a carbon protective layer A having a thickness of 10 Å was formed thereon. Both the low refractive index layers and the high refractive index layers were formed by the electron beam vapor deposition in the ultra-high vacuum (below $10^{-6}$ Pa). The vapor deposition rate was 0.2 Å/sec for both materials. When a light having a wavelength of 124.0 Å was directed. normally thereto, a reflection factor of 31.3% was attained.

Another multi-layer reflection mirror of a 41-layer structure with the tantalum nitride layer thickness of 22.1 Å and the silicon carbide layer thickness of 43.5 Å was formed. When the light having a wavelength of 124.0 Å was directed thereto at an incident angle of 20° with respect to a normal line, a reflection factor of 32.8% was attained.

Comparative Example (Sold (Au) was used for the low refractive index layers and carbon (C) was used for the high refractive index layers, and a multi-layer reflection mirror for soft X-ray to vacuum ultraviolet ray was manufactured by the electron beam vapor deposition method in a similar manner to that of the embodiment 1.

The reflection mirror was mounted on a soft X-ray spectrometer which used a synchrotron track radiation light (SR) and it was subjected to the radiation light for total of five hours. Cracks and peel-off of the films were observed. The multi-layer reflection mirrors manufactured in the Embodiments 1, 2, 3, 4, 5 and 6 were mounted on the spectrometer and subjected to the radiation for the same time. No damage was observed.

The multi-layer reflection mirror for X-ray to vacuum ultraviolet ray of the present invention has a high reflection factor to the light in the range of soft X-ray to vacuum ultraviolet ray and has a sufficiently long durability compared to the prior art reflection mirror which is substantially damaged in a short time by the irradiation of the synchrotron track radiation light (SR).

By combining a plurality of planar or curved reflection mirrors, a reduction/enlarge optical system for X-ray, a reflection mirror for a laser resonator in a range of soft X-ray to vacuum ultraviolet ray, and a reflection type dispersion element with a grid-structure reflection mirror, which have not been available hithertofore in the range of X-ray, are provided and an application range of the optical elements is expanded.

We claim:

1. A multi-layer reflection mirror for soft X-ray to vacuum ultraviolet ray, comprising:
   a plurality of first layers, each of said first layers, comprising ruthenium as a main constituent thereof;
   a plurality of second layers, each of said second layers being alternately layered to each of said first layers, each of said second layers comprising silicon dioxide as a main constituent thereof; and
   a substrate supporting said first and second layers, said substrate selected from the group consisting of glass, quartz, silicon single crystal and silicon carbide having a surface roughness of less than 10 Å (rms).

2. A reflection mirror according to claim 1, wherein said reflection mirror reflects a synchrotron radiation.

3. A reflection mirror for soft X-ray to vacuum ultraviolet ray, comprising:
   a substrate selected from the group consisting of glass, quartz, silicon single crystal and silicon carbide having a surface roughness of less than 10 Å (rms); and
   a multi-layer film formed on said substrate, said multi-layer film having a plurality of first layers and a plurality of second layers, each of said second layers being alternately layered to each of said first layers on said substrate, each of said first layers comprises as a main constituent thereof one single element of a transition metal, each of said second layers comprising at least one nitride and at least one oxide selected from the group consisting of boron and silicon.

4. A reflection mirror according to claim 3, wherein said substrate comprises silicon carbide.

5. A reflection mirror according to claim 3, wherein said first layers comprise hafnium and said second layers comprise silicon nitride.

6. A reflection mirror according to claim 5, wherein said substrate comprises molten quartz.

7. A reflection mirror according to claim 3, wherein said reflection mirror reflects a synchrotron radiation.

8. A reflection mirror according to any one of claim 3 through 6, wherein said substrate has a planar surface.

9. A multi-layer mirror for soft x-ray to vacuum ultraviolet ray, comprising:
   a substrate selected from the group consisting of glass, quartz, silicon single crystal and silicon carbide; and
   a multi-layer film formed on said substrate, said multi-layer film having a plurality of first layers and a plurality of second layers, each of said second layers being alternately layered to each of said first layers on said substrate, each of said first layers comprising as a main constituent thereof one single element of a transition metal, each of said second layers comprising at least one silicon nitride or silicon oxide, and a carbon layer formed on said multi-layer film.

10. A multi-layer mirror according to claim 9, wherein said multi-layer mirror reflects a synchrotron radiation.

11. A multi-layer mirror according to claim 9, wherein said substrate has a roughness of less than 10 rms.

* * * * *

UNITED STATES PATENT AND TRADEMARK OFFICE
CERTIFICATE OF CORRECTION

PATENT NO. : 5,433,988
DATED : July 18, 1995
INVENTOR(S) : Yasuaki Fukuda, et. al.

It is certified that error appears in the above-indentified patent and that said Letters Patent is hereby corrected as shown below:

Title page, item
[57] Abstract

Line 5, "consists" should read --consist--;

Line 6, "boride" should read --boride,--; and

Line 8, "consists" should read --consist--.

COLUMN 1

Line 16, "multilayer" should read --multi-layer--;

Line 23, "(reflectivity)" should read --reflection factor (reflectivity)--;

Line 35, "face" should read --fact--;

Line 36, "reflection" should read --the reflection--;

Line 51, "$\delta$," (second occurrence) should read --$\delta$

Line 52, "Flesnel" should read --Fresnel--;

Line 61, "maximized" should read --maximized,--; and

Line 62, "and," should read --and--.

COLUMN 2

Line 40, "refractive layers" should read --refractive index layers--; and

Line 43, "element" should read --elements--.

UNITED STATES PATENT AND TRADEMARK OFFICE
CERTIFICATE OF CORRECTION

PATENT NO. : 5,433,988
DATED : July 18, 1995
INVENTOR(S) : Yasuaki Fukuda, et. al.

It is certified that error appears in the above-indentified patent and that said Letters Patent is hereby corrected as shown below:

COLUMN 3

Line 3, "berylium" should read --beryllium--;

Line 4, "(SIC)" should read --(SiC)--;

Line 37, "reflection" should read --retractive--; and

Line 61, "(SIC)" should read --(SiC)--.

COLUMN 4

Line 7, "a" should read --an--;

Line 8, "vapor;" should read --vapor--;

Line 37, "a" should read --an--; and

Line 66, "ultrahigh" should read --ultra-high--.

COLUMN 5

Line 3, "ultraviolet-ray," should read --ultraviolet ray,--

Line 27, "boronide," should read --boride,--;

Line 36, "of-carbide," should read --of carbide--;

Line 38, "(TAN)" should read --(TaN)--;

Line 63, "C." should read --C.,--; and

Line 68, "beth" should read --both--.

UNITED STATES PATENT AND TRADEMARK OFFICE
CERTIFICATE OF CORRECTION

PATENT NO. : 5,433,988
DATED : July 18, 1995
INVENTOR(S) : Yasuaki Fukuda, et. al.

It is certified that error appears in the above-indentified patent and that said Letters Patent is hereby corrected as shown below:

COLUMN 6

Line 17, "(TAN)" should read --(TaN)--; and

Line 23, "nitride," should read --nitride--.

COLUMN 7

Line 25, "(TIN)," should read --(TiN),--;

Line 28, "(TAN," should read --(TaN,--;

Line 33, "(SIC)," should read --(SiC),--;

Line 35, "(TIC)," should read --(TiC),--;

Line 43, "$n_2=n_2+ik_2$" should read --$\hat{n}_2=n_2+ik_2$--;

Line 45, "$<10^{-3}$" should read --$<10^{-1}$,--;

Line 58, "coeffici-" should read --index--; and

Line 59, "ent" should be deleted.

COLUMN 8

Line 2, "Example 7" should read --Embodiment 7--;

Line 4, "(SIC)" should read --(SiC)--;

Line 8, "(SIC)" should read --(SiC)--;

Line 26, "index" should read --factor--;

UNITED STATES PATENT AND TRADEMARK OFFICE
CERTIFICATE OF CORRECTION

PATENT NO. : 5,433,988
DATED : July 18, 1995
INVENTOR(S) : Yasuaki Fukuda, et. al.

Page 4 of 5

It is certified that error appears in the above-indentified patent and that said Letters Patent is hereby corrected as shown below:

COLUMN 8, Cont'd.

Line 29, "Embodiment 7" should read --Embodiment 8--;

Line 31, "the-same" should read --the same--;

Line 32, "(TAN)" should read --(TaN)--;

Line 34, "(SIC)" should read --(SiC)--;

Line 46, "directed." should read --directed--;

Line 57, "(Sold" should read --Gold--; and

Line 66, "total" should read --a total--.

COLUMN 9

Line 15, "hither-" should read --hue- --; and

Line 21, "layers," (second occurrence) should read --layers--.

COLUMN 10

UNITED STATES PATENT AND TRADEMARK OFFICE
CERTIFICATE OF CORRECTION

PATENT NO. : 5,433,988
DATED : July 18, 1995
INVENTOR(S) : Yasuaki Fukuda, et. al.

It is certified that error appears in the above-indentified patent and that said Letters Patent is hereby corrected as shown below:

Line 18, "claim" should read --claims--.

Signed and Sealed this

Twenty-first Day of November, 1995

Attest:

BRUCE LEHMAN

Attesting Officer

Commissioner of Patents and Trademarks